(12) United States Patent
Raker (10) Patent No.: US 9,620,943 B2
(45) Date of Patent: Apr. 11, 2017

(54) CABLE PREPARATION TOOL AND METHODS THEREFOR

(71) Applicant: Joshua Douglas Raker, Lewisville, TX (US)

(72) Inventor: Joshua Douglas Raker, Lewisville, TX (US)

(73) Assignee: Corning Optical Communications LLC, Hickory, NC (US)

( * ) Notice: Subject to any disclaimer, the term of this patent is extended or adjusted under 35 U.S.C. 154(b) by 581 days.

(21) Appl. No.: 13/773,758

(22) Filed: Feb. 22, 2013

(65) Prior Publication Data

US 2013/0220097 A1 Aug. 29, 2013

Related U.S. Application Data

(60) Provisional application No. 61/604,755, filed on Feb. 29, 2012, provisional application No. 61/730,702, filed on Nov. 28, 2012.

(51) Int. Cl.
| | |
|---|---|
| *H02G 1/12* | (2006.01) |
| *G02B 6/245* | (2006.01) |
| *G02B 6/44* | (2006.01) |
| *G02B 6/25* | (2006.01) |

(52) U.S. Cl.
CPC ........... *H02G 1/1214* (2013.01); *G02B 6/245* (2013.01); *G02B 6/25* (2013.01); *G02B 6/4484* (2013.01); *Y10T 83/0207* (2015.04)

(58) Field of Classification Search
CPC .......... H02G 1/12; H02G 1/1214; G02B 6/25; G02B 6/245; G02B 6/46; G02B 6/4484; G02B 6/4497
USPC .... 7/107, 108; 30/123, 287, 299, 90.1–91.2, 30/304, 305; 81/9.4–9.44
See application file for complete search history.

(56) References Cited

U.S. PATENT DOCUMENTS

| | | | | |
|---|---|---|---|---|
| 4,081,871 | A * | 4/1978 | Knuth | ............................... 7/107 |
| 6,324,945 | B1 * | 12/2001 | Lo et al. | ......................... 81/9.44 |
| 2004/0159197 | A1 * | 8/2004 | Forsberg | ................. B26B 17/00 83/13 |
| 2004/0205897 | A1 * | 10/2004 | Hartranft et al. | .................. 7/107 |
| 2006/0005315 | A1 * | 1/2006 | Konen | ............................... 7/107 |
| 2010/0058581 | A1 * | 3/2010 | Aguiar et al. | .................. 29/825 |
| 2011/0072593 | A1 * | 3/2011 | Battenfeld | ................ B25B 7/22 7/107 |

\* cited by examiner

*Primary Examiner* — Stephen Choi
*Assistant Examiner* — Evan MacFarlane
(74) *Attorney, Agent, or Firm* — C. Keith Montgomery (57) ABSTRACT

A tool for preparing a cable for connectorization. The tool has a portion for stripping a cable jacket and another portion for cutting fibrous strength elements, such as aramid strength elements, relative to the exposed fiber. The strength element cutting portion includes a blade enclosed in a cover that also serves as a handle for the tool. The cover also has a stop edge to ensure that a desired excess length of the strength element remains after cutting the strength element. The excess strength element length can then be used to connectorize the cable.

9 Claims, 14 Drawing Sheets

CABLE PREPARATION TOOL AND METHODS THEREFOR

PRIORITY

This application claims the benefit of priority under 35 U.S.C. §119 of U.S. Provisional Application No. 61/604,755, filed on Feb. 29, 2012, and to U.S. Provisional Application No. 61/730,702, filed on Nov. 28, 2012, the contents of which are relied upon and incorporated herein by reference in their entireties.

BACKGROUND

The disclosure relates generally to an apparatus for preparing a cable for connectorization and more particularly to a hand tool for preparing a cable for connectorization and associated methods therefor.

Communications cables have communication components, such as optical fibers, and are often enclosed in a polymer jacket to protect the communication components. Fiber optic cables are often terminated with a field installable connector so that one or more fibers can be connected at an installation site. There are a number of tools available to facilitate field connectorization of jacketed fiber optic cables, and installation of connectors is labor-intensive. A typical cable preparation process includes the following steps: mark jacket to specified strip lengths; set marking device down; remove jacket stripping tool from the toolkit; remove jacket cover; replace jacket stripping tool to the toolkit (or set it down on a table/work surface); pick up marking device; mark aramid yarn to cut length; set marking device down; remove scissors from toolkit; cut yarn to length at the mark; and pick jacket stripping tool back up and continue subsequent installation steps.

SUMMARY

According to a first embodiment, a tool for preparing a cable for connectorization comprises a first handle having a stripper end, a second handle having a stripper end, the second handle being pivotably joined to the first handle, and a cutting feature disposed on the first handle. The stripper ends of the first and second handles are arranged to cooperate for removing a portion of a jacket of a cable, and the cutting feature is arranged on the first handle to sever a strength element of a cable.

According to a second embodiment, a method for preparing a cable for connectorization comprises providing a tool having a first handle having a stripper end, a second handle having a stripper end, the second handle being pivotably joined to the first handle, and a cutting feature, placing the cable between the stripper ends, removing an end portion of the jacket using the tool to expose strength elements, and using the cutting feature to sever the strength elements.

Additional features and advantages will be set forth in the Detailed Description.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
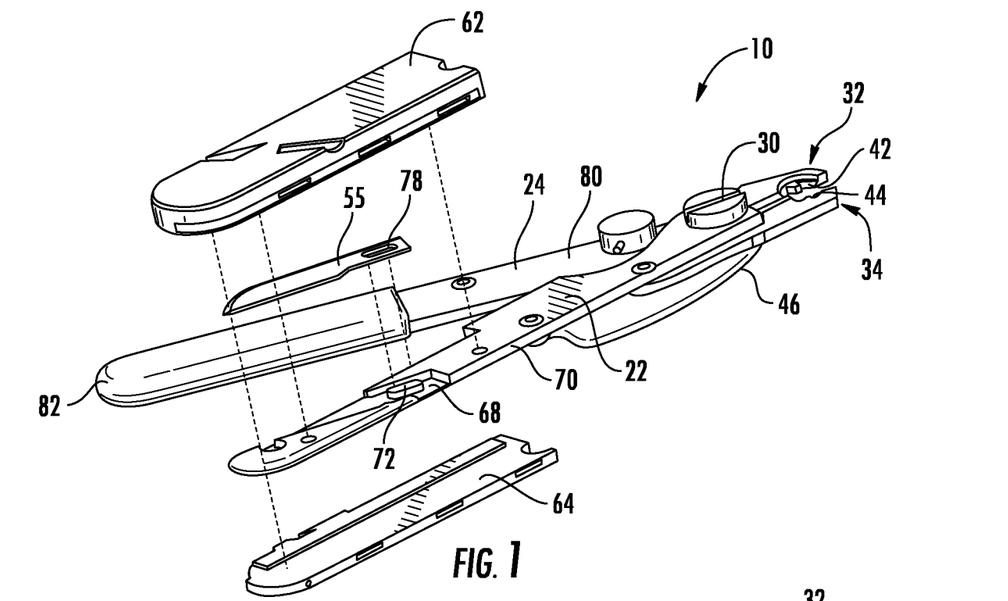
FIG. 1 is a partially exploded perspective view of a tool according to a first embodiment.

FIG. 1 is a partially exploded perspective view of a tool 10 according to the present embodiments. The tool 10 can be structurally similar to a FO 103-T-250-J: Tri-Hole Fiber Optic Stripper tool available from RIPLEY®, under the MILLER® brand, that has been adapted to have the ability to cut strength elements such as aramid yarn, as described in further detail below. MILLER® Two-Hole Fiber Optic Strippers tools can also be adapted in accordance with the principles of the present invention.

Figure 2:
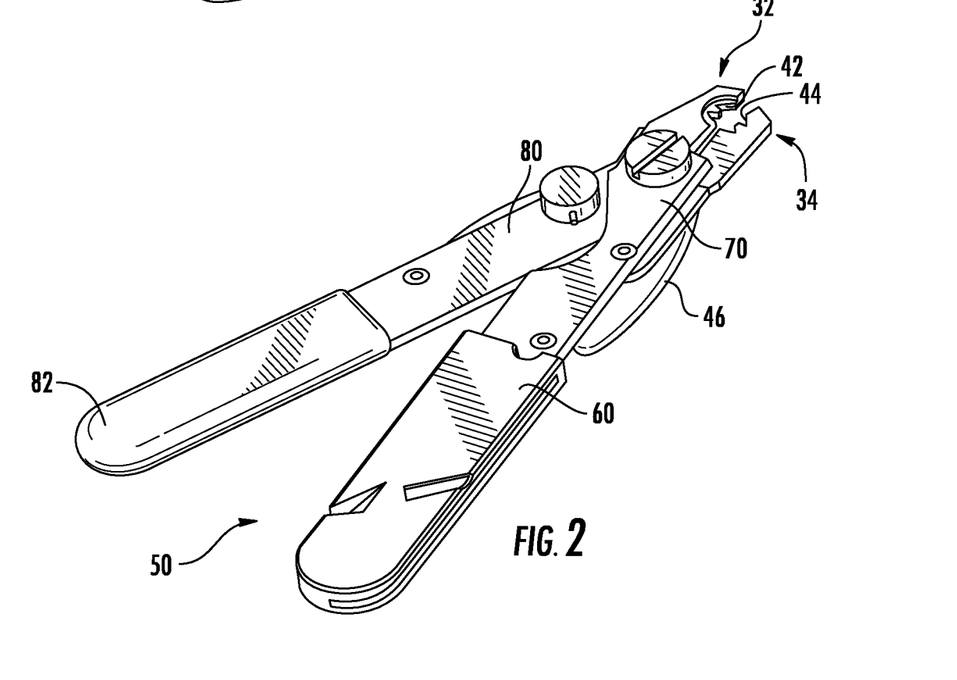
FIG. 2 is a perspective view of the embodiment of FIG. 1.

FIG. 2 shows the assembled tool 10. The tool 10 has a first handle 22 and a second handle 24 by which the tool 10 is grasped during jacket stripping. The first and second handles 22, 24 are joined together about a pivot element 30, such as a bolt, and pivot about an axis coincident with the element 30. The first handle 22 terminates in a stripper end 32, and the second handle terminates in a stripper end 34. The ends 32, 34 each have notches 42, 44, or cutouts, with sharpened inwardly-facing edges. When the handles 22, 24 are drawn together, the ends 32, 34 also close together so that the notches 42, 44 form apertures in which a cable to be stripped is held. A spring 46 biases the ends 32, 34 apart. The sharpened edges of the notches 42, 44 serve to penetrate the cable jacket so that it can be stripped from the cable. In the illustrated embodiment, each handle 22, 24 has two notches so that two aperture sizes are formed during operation, although additional notches can be included to form additional apertures to accommodate a greater range of jacket sizes.

Referring to FIGS. 1 and 2, at the gripping end of the tool 10, the first handle 22 has a cutting feature 50 as an integral feature of the tool to render the cable preparation process more efficient. The cutting feature 50 includes a cutting element 55, illustrated as a blade, surrounded by a cover 60 formed from first and second cover pieces 62, 64. The cutting element 55 lies in a relief section 68 of an elongate metallic section 70 of the first handle 22. The metallic section 70 is a unitary piece from which the notches 42, 44 are removed and in which the sharpened edges thereof are also formed. The metallic section 70 can also include a fixing piece 72, such as a projection, that engages an aperture 78 in the cutting element 55 to in part fix the cutting element 55 to the first handle 22. The second handle 24 also includes a unitary, elongate metallic section 80 with a cover 82, such as of plastic.

In the assembled tool 10, the cover pieces 62, 64 are closely fixed to opposite sides of the first handle 22 so that that cutting element 55 is securely held between the pieces 62, 64. Screws or other fastening elements can be used to hold the pieces 62, 64 in place.

Figure 3:
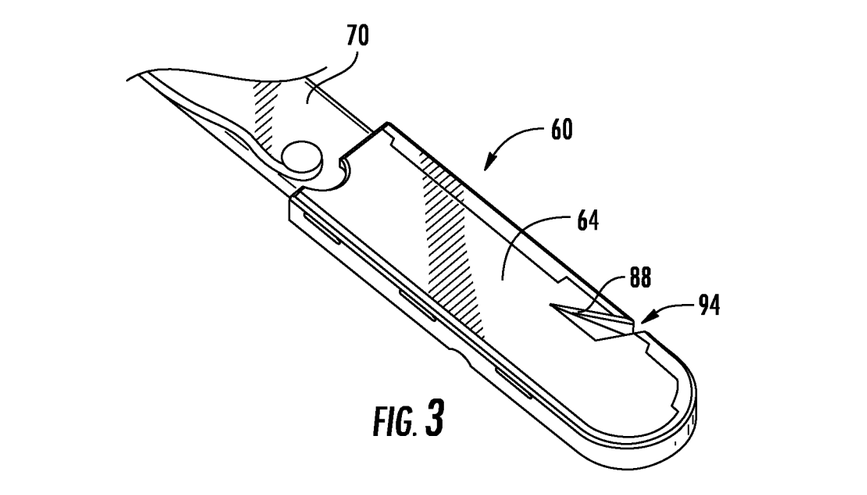
FIG. 3 is a close-up perspective view of a first handle of the tool of FIG. 1.
Figure 4:
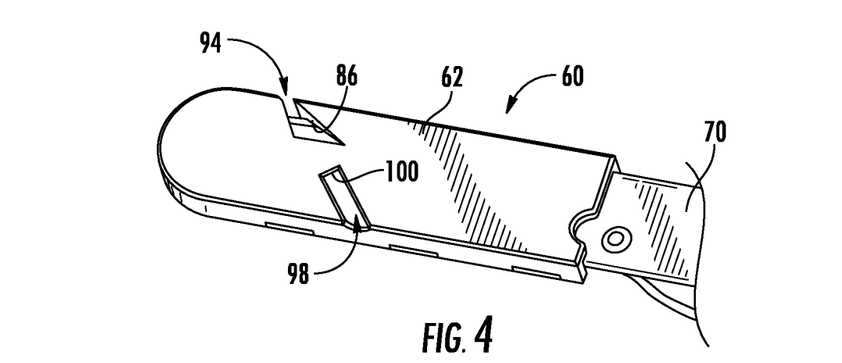
FIG. 4 is a close-up perspective view of the first handle.

Referring to FIGS. 3 and 4, the cover 60 includes one or more apertures that provide access to the cutting element 55 so that pieces such as aramid yarns or fibers can be cut during cable preparation. In the illustrated embodiment, the first cover piece 62 has a first cutting aperture 86 and the second cover piece 64 has a second cutting aperture 88.

Figure 5:
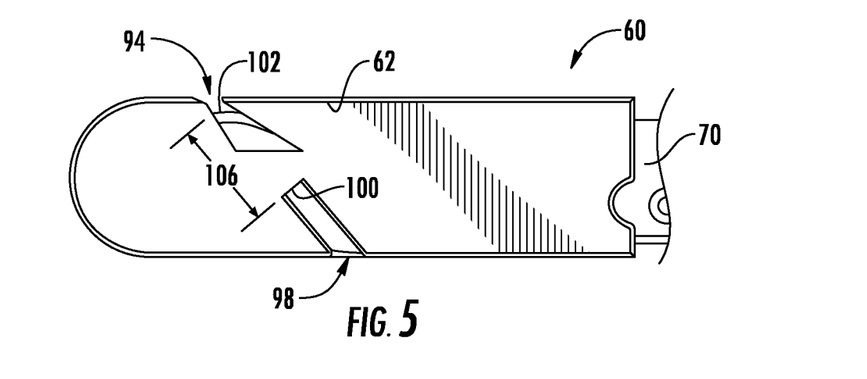
FIG. 5 is a close-up view of the first handle.

Referring to FIG. 5, the first and second cutting apertures 86, 88 form a cutting aperture 94 in the cover 60. The cutting aperture 94 exposes a cutting surface 102 of the cutting element 55. A cable locating aperture or slot 98 provides a recess in the first handle 22 in which a cable sits during cable preparation. A stop edge 100 of the locating slot 98 is used to place the cable at a specified distance from the cutting element 55. The cutting aperture 94 opens toward in inwardly facing side of the handle 22, in other words, the aperture 94 faces towards the second handle 24. Accordingly the blade 55 also faces inwardly in the tool 10. The locating slot 98 is disposed toward an outwardly facing side of the first handle 22. Reference number 106 indicates a distance corresponding to a desired for finished yarn after cutting. Distance 106 generally indicates a distance from the stop edge 100 to the cutting surface 102.

Figure 6:
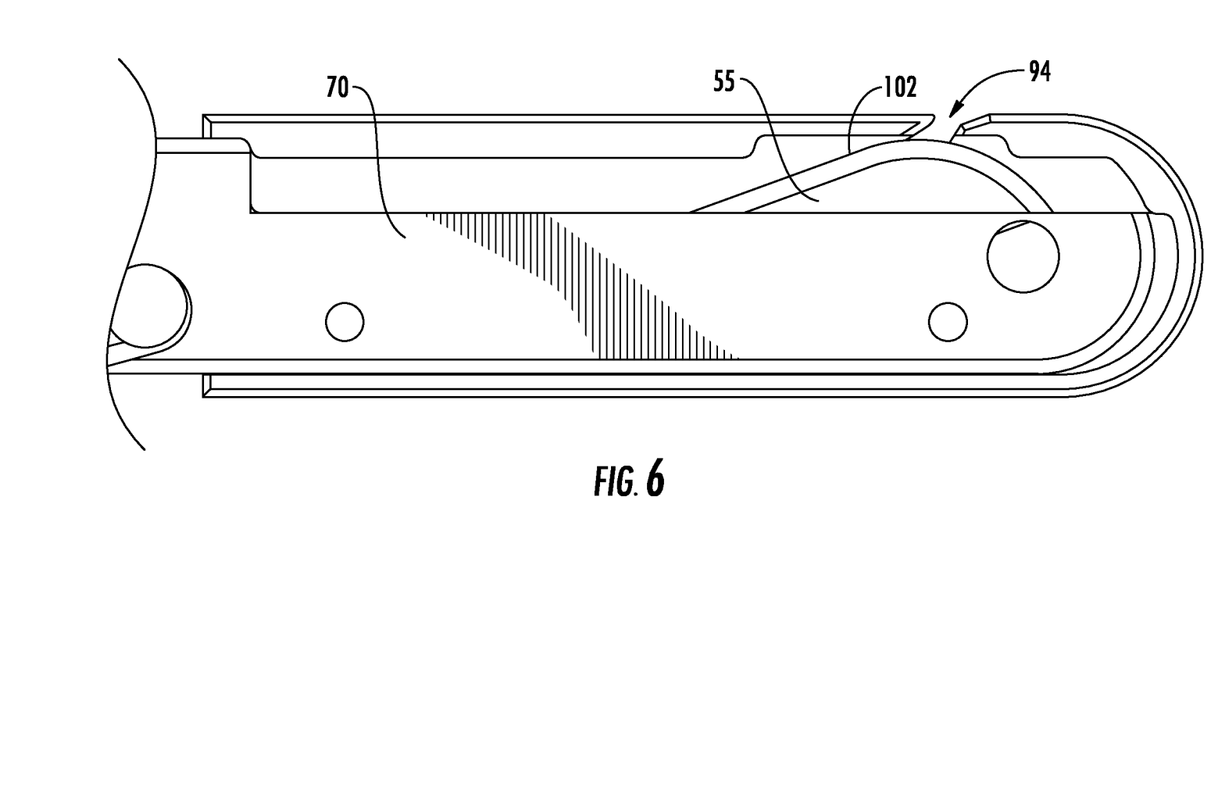
FIG. 6 is a view of a first handle with one handle cover removed.

FIG. 6 is a top view of the first handle 22 the tool 10 with the second cover piece 64 removed. This figure illustrates the orientation of the cutting element 55 with respect to the cutting aperture 94 in the first handle 22.

Figure 7:
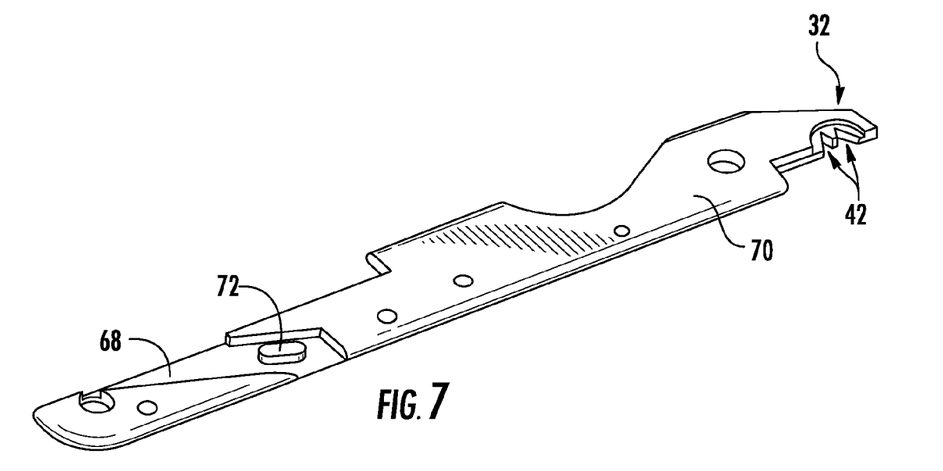
FIG. 7 is a perspective view of a part of the first handle.
Figure 8:
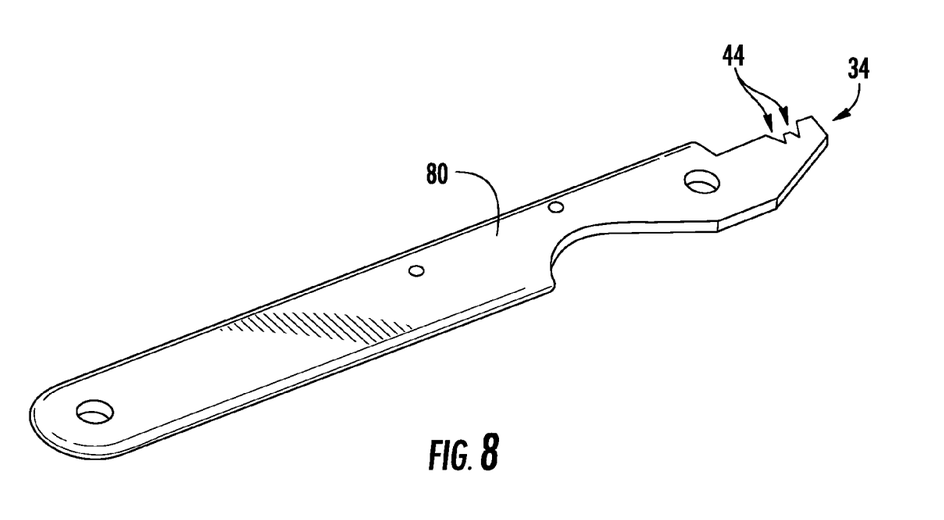
FIG. 8 is a perspective view of a part of the second handle of the tool.

FIG. 7 is a perspective view of first metallic section 70 of the first handle 22. FIG. 8 is a perspective view of the second metallic section 80 of the second handle 24.

Figure 9:
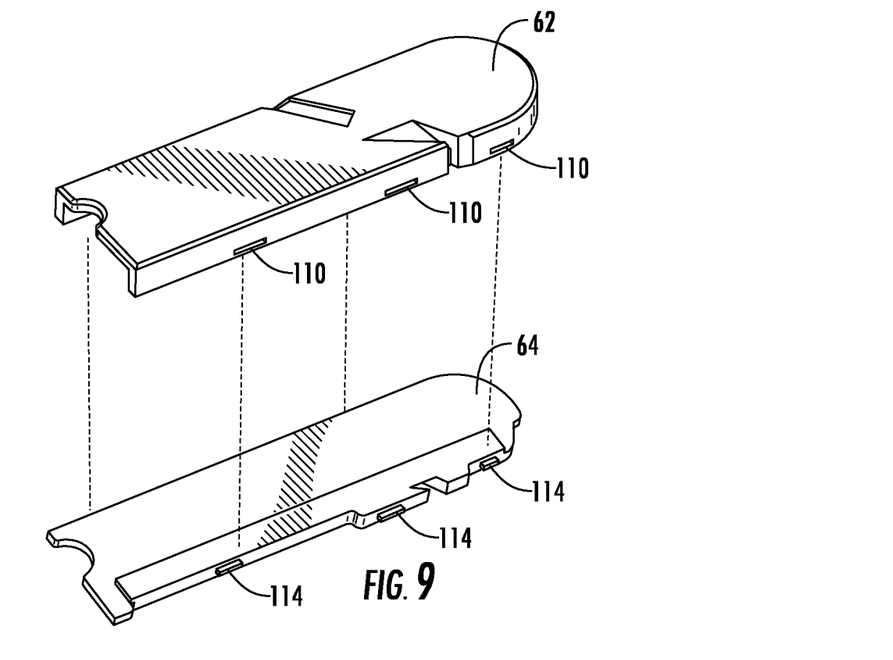
FIGS. 9 and 10 are exploded perspective views of cover pieces of the first handle.
Figure 10:
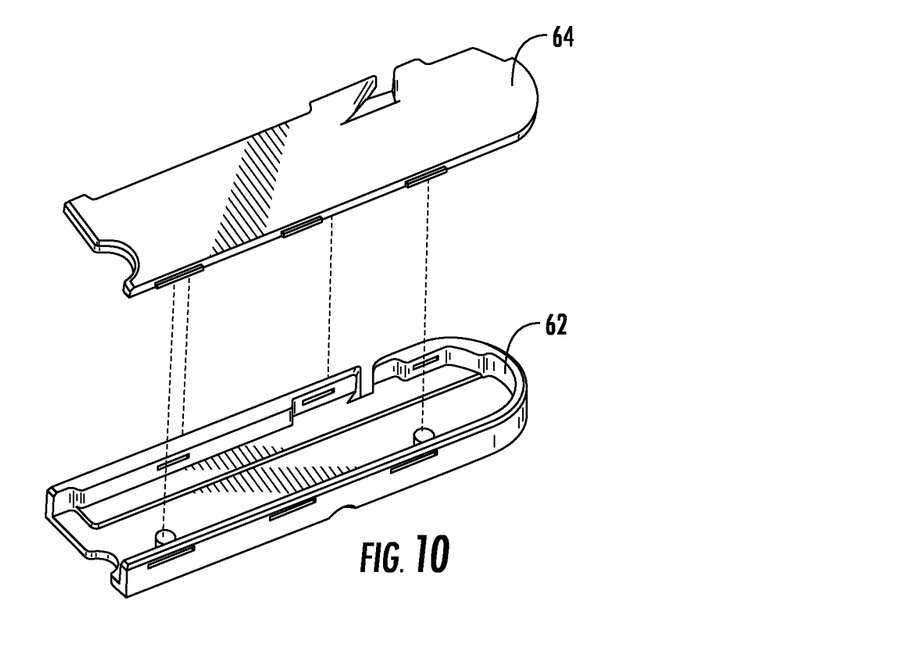

FIGS. 9 and 10 are exploded perspective views of the first and second cover pieces 62, 64. The first cover piece 62 has apertures 110 in which tabs 114 in the second cover piece 64 engage to secure the pieces 62, 64 in place.

Figure 11:
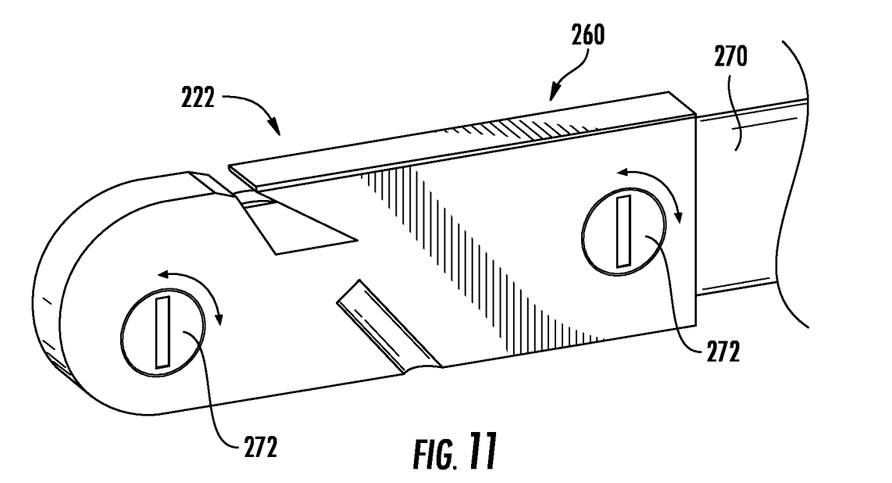
FIGS. 11 and 12 are close-up perspective views of a second embodiment of the disclosure having a quick release mechanism.
Figure 12:
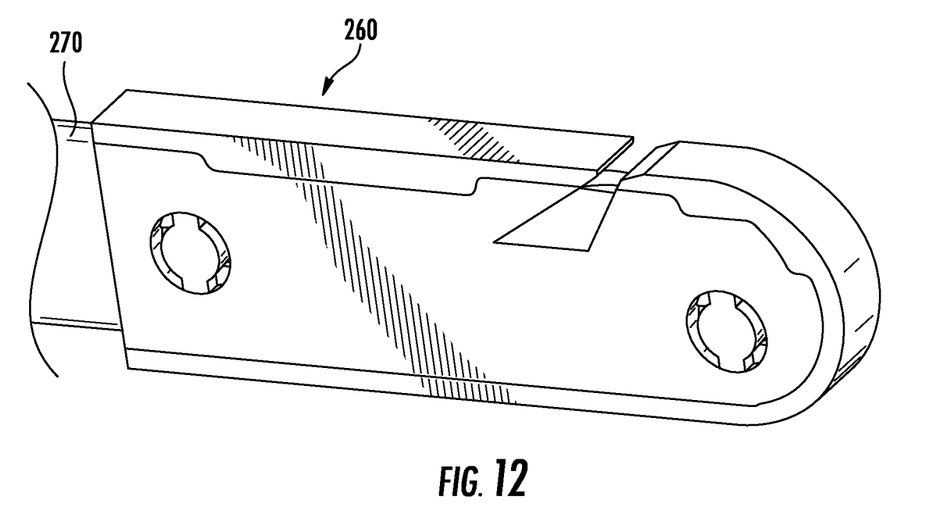

FIGS. 11 and 12 are close-up perspective views of a tool handle 222 having quick release locking mechanism. The handle 222 has a cover 260 formed from a single piece that slides over a metallic handle section 270. Turning the locking screws 272 90 degrees allows the handle 222 to be slid off of the metallic section 270. The cover 260 can thus be exchanged for a new cover, such as, for example, when the cutting element is dull.

FIGS. 13-18 illustrate a cable preparation method using the tool 10.

Figure 13:
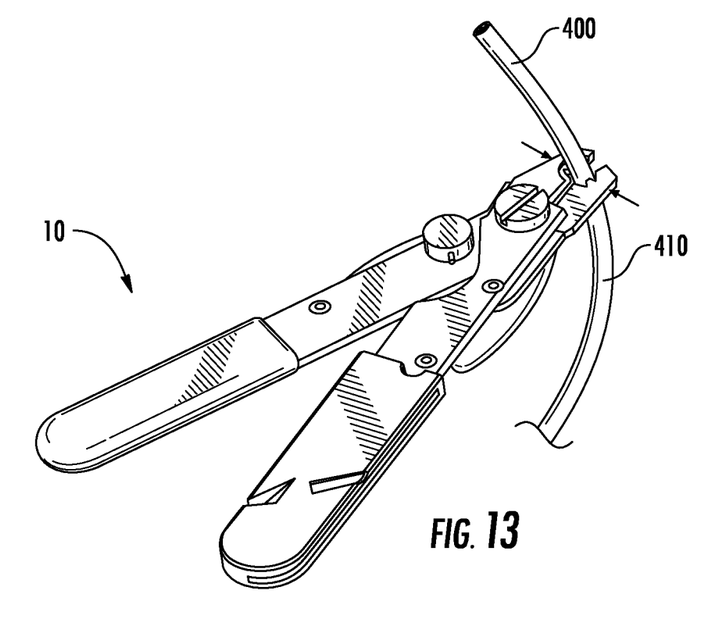
FIGS. 13-18 illustrate a cable preparation method using the tool of FIGS. 1-10.

Referring to FIG. 13, a cable 400 having a jacket 410 is positioned between the appropriate notches 42, 44 of the tool 10. The ends 32, 34 are then closed around the cable 410 so that the sharpened edges pierce the jacket 410. The cable jacket 410 can be marked to a specified strip length prior to this step.

Figure 14:
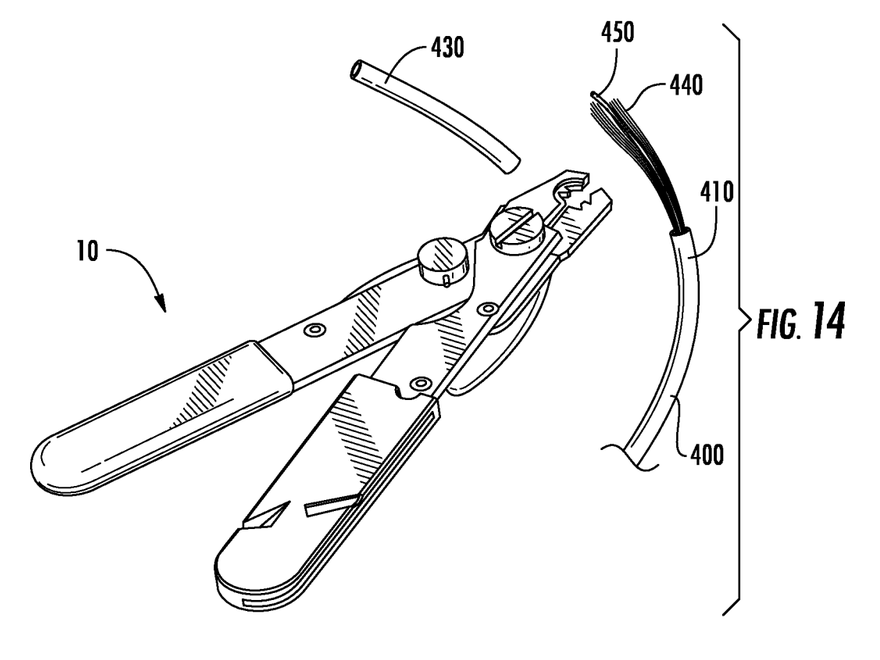

Referring to FIG. 14, an end portion 430 of the jacket 410 is removed, exposing aramid yarn strength elements 440 and one or more fibers 450 within the jacket 410. The end portion 430 can be pulled off by hand or by motion of the tool.

Figure 15:
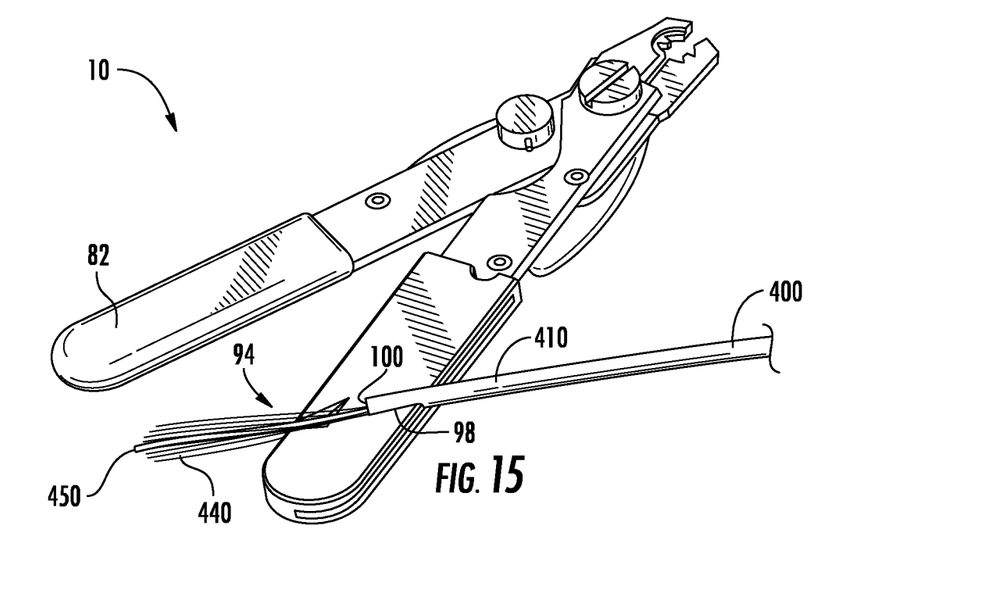

Referring to FIG. 15, the partially prepared cable 400 is placed in the cable locating slot 98 in the first handle 22. The end edge of the jacket 410 left after the end portion 430 is removed is pressed against the stop edge 100.

Figure 16:
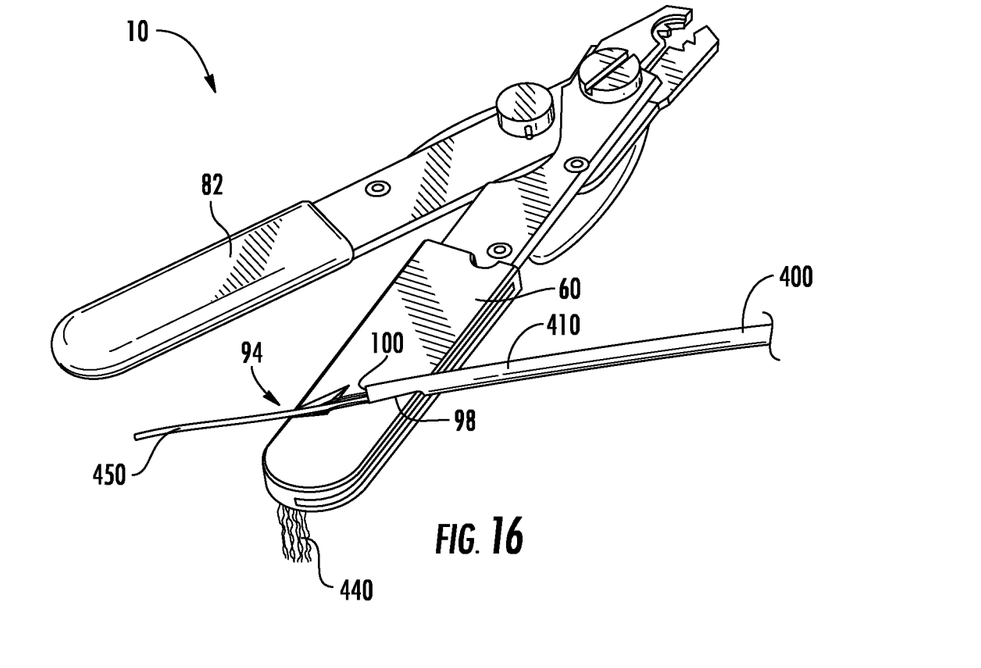

Referring to FIG. 16, the aramid yarn strength elements 440 are pulled across the first cover 60 and into the cutting aperture 94.

Figure 17:
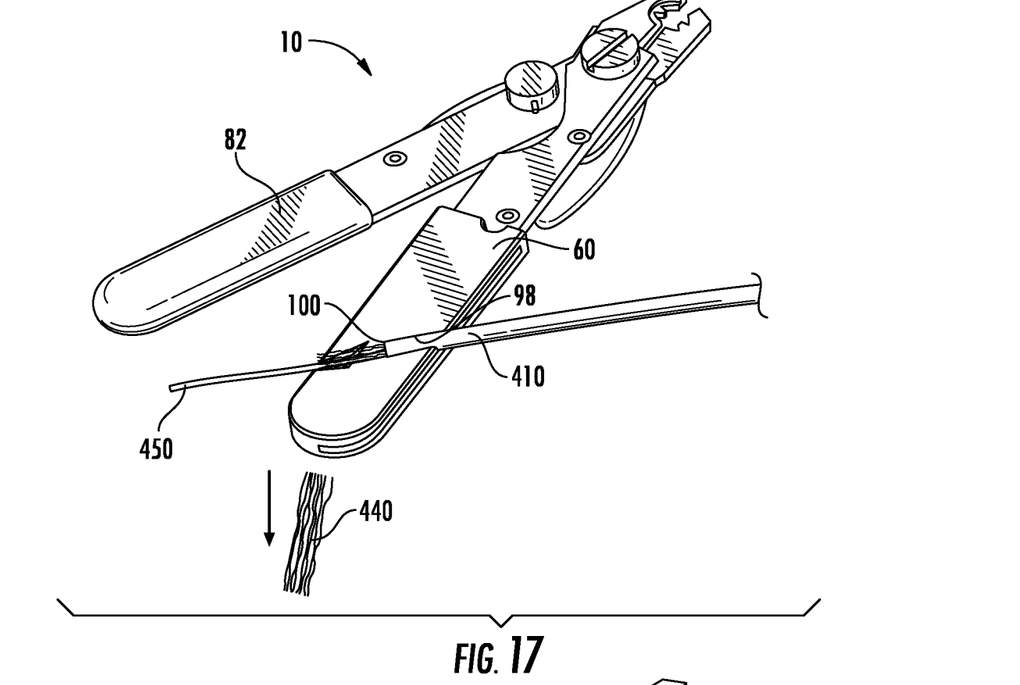

Referring to FIG. 17, the aramid yarn strength element 440 is severed over the surface 102 of the cutting element 55.

Figure 18:
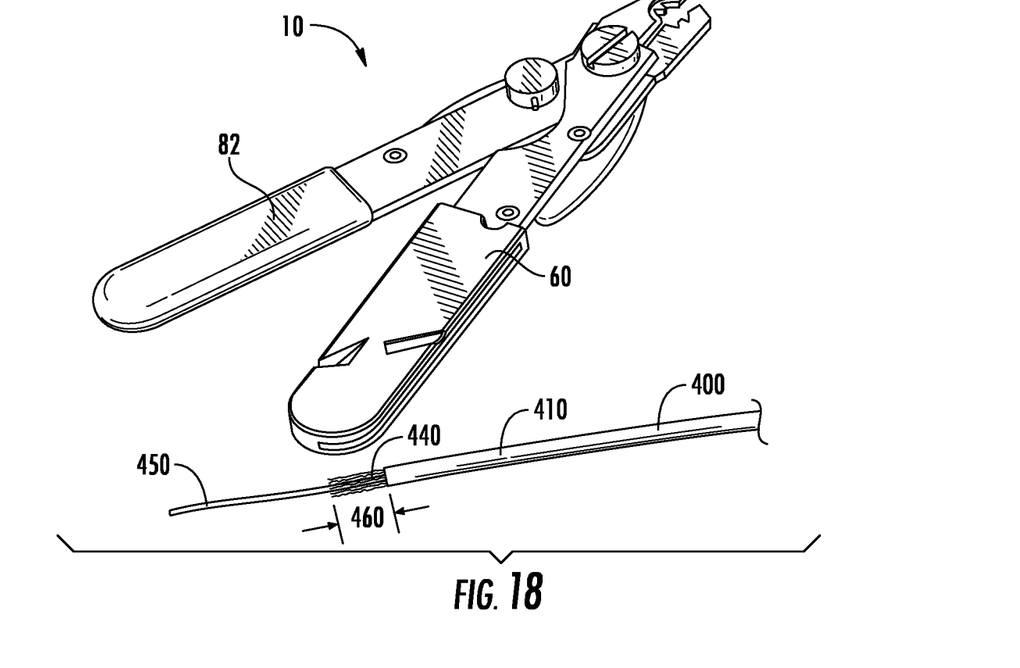

Referring to FIG. 18, the fiber(s) 450 of the cable 400 extend past the severed strength elements 440, and the cable 400 is now prepared for further installation steps. The length 460 that the aramid yarn strength elements 440 extend past the cable jacket 410 is a predetermined distance that is a product of the distance between the stop edge 100 of the cable locating slot 98 and the edge 102 of the cutting element 55. In a typical application, the distance will be in the range of 7-17 millimeters.

Figure 19:
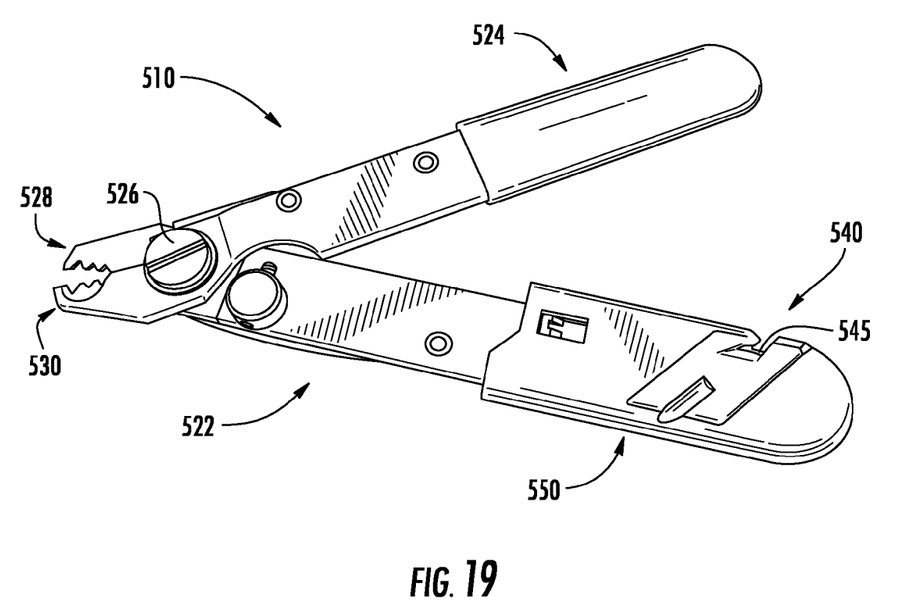
FIG. 19 is a perspective view of an embodiment having a removable handle cover.

FIG. 19 illustrates a tool 510 according to yet another embodiment. The tool 510 has a first handle 522 and a second handle 524 by which the tool 510 is grasped during jacket stripping. The first and second handles 522, 524 are joined together about a pivot element 526, such as a bolt, and pivot about an axis coincident with the element 526. The first handle 522 terminates in a stripper end 528, and the second handle terminates in a stripper end 530. The stripping function of the tool 510 can work in the same manner as that of the tool 10 illustrated in FIG. 2. At the gripping end of the tool 510, the first handle 522 has a cutting feature 540 as an integral feature of the tool to render the cable preparation process more efficient. The cutting feature 540 includes a cutting element 545, illustrated as a blade, and a removable cover 550 in which the blade is disposed.

Figure 20:
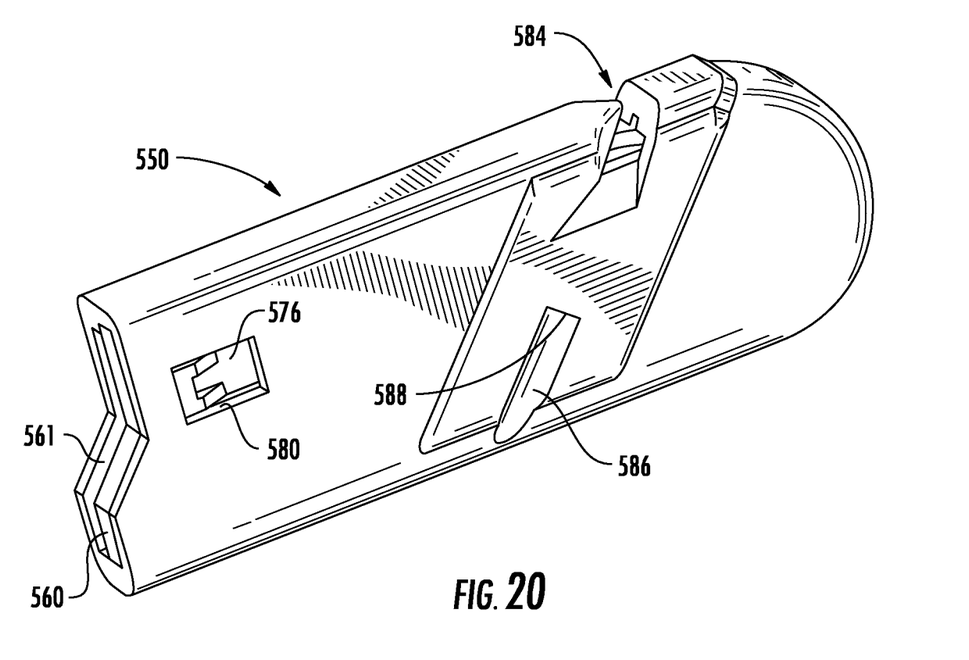
FIG. 20 is an isolated view of the cover of the tool of FIG. 19.
Figure 21:
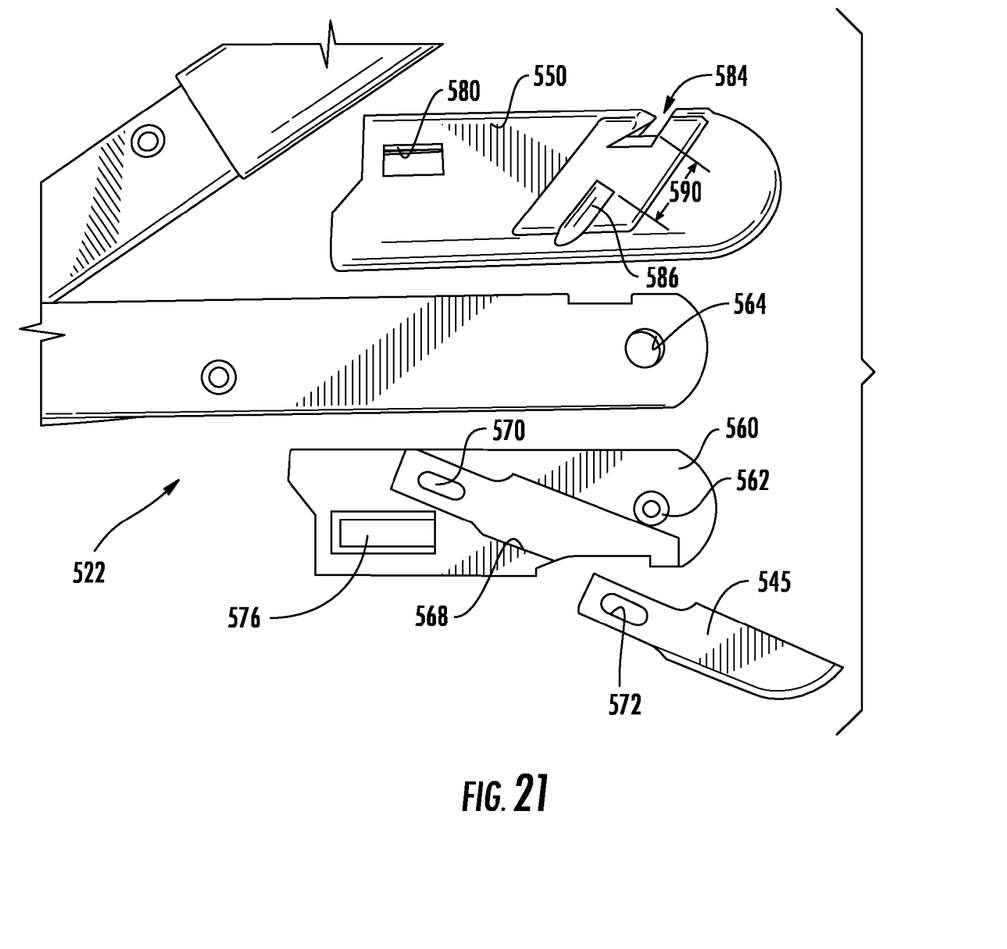
FIG. 21 is an exploded view of the components of the tool illustrated in FIG. 19.

FIG. 20 illustrates the cover 550 separated from the tool 510. The cover 550 has the form of a narrow, hollow housing having a passageway 561 that receives the handle 522. FIG. 20 also illustrates a mounting piece 560 which is also disposed within the passageway 561. FIG. 21 is a partially exploded partial view of the tool 510. The arrangement of the component parts of the cover 550 is described below with reference to FIGS. 20 and 21. The cover 550 is mounted to the first handle 522 by the mounting piece 560. The mounting piece 560 has a mounting post 562 that is sized to be received within a mounting aperture 564 in the first handle 522. When the cover 550 is slid over the mounting piece 560 and the handle 522, the cover 550 and mounting piece 560 are secured on the first handle 522 by the engagement of the post 562 with the aperture 564.

Figure 22:
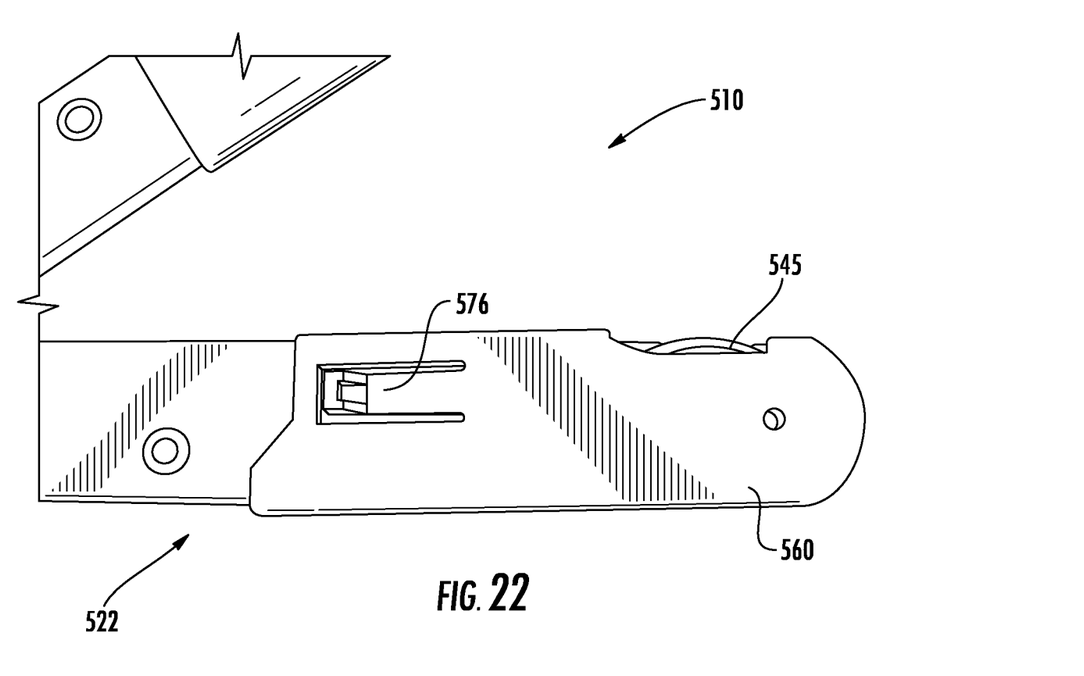
FIG. 22 illustrates a mounting piece of the tool of FIG. 19 placed on a handle of the tool.

Still referring to FIGS. 20 and 21, the mounting piece has a relief section 568 in which the cutting element 545 sits in the assembled tool 510, and a projection 570 that engages an aperture 572 in the cutting element 545 to secure the cutting element 545 in place. When the mounting piece 560 is placed on the handle 522, the cutting element 545 is sandwiched between the mounting piece 560 and the handle 522 (shown in FIG. 22). In the assembled tool 510, the cover 550 extends over the mounting piece 560, which is secured to the first handle 522. The cover 550 is locked in place over the mounting piece 560 by a locking tab 576 that extends into a locking aperture 580 in the cover 550. The locking tab 576 is hingedly attached on the mounting piece 560 to allow for engagement and disengagement with the aperture 580. The cover 550 includes a cutting aperture 584 that provides access to the cutting element 545 so that elements such as aramid yarns or fibers can be cut during cable preparation. A cable locating slot 586 provides a recess in which a cable sits during cable preparation. A stop edge 588 places the cable at a specified distance from the cutting element 545. Reference number 590 indicates a distance corresponding to a desired for finished yarn after cutting. Distance 590 generally indicates a distance from the stop edge 588 to the cutting surface of the cutting element 545. In a typical application, the distance 590 will be in the range of 7-17 millimeters.

Figure 23:
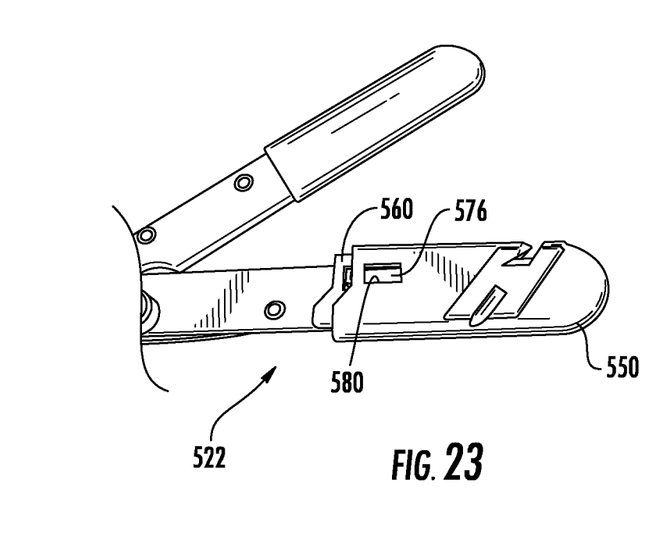
FIGS. 23-24 illustrate removal of the handle from the tool.
Figure 24:
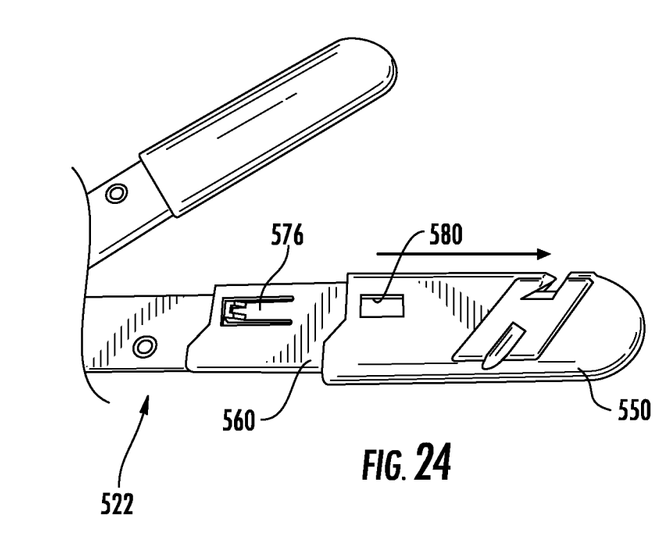

The tool 510 is designed for cable preparation in a manner similar to the method shown in FIGS. 13-18, and the same benefits and ease of operation in cable preparation can be obtained by any of the embodiments disclosed in this Description. The tool 510 has the additional feature of easy and quick removal of the cover 550, so that the cutting element 545 can be removed and exchanged without tools or other special equipment. Referring to FIGS. 23-24, the cover 550 can be slid off of the first handle 522 by pressing the locking tab 576 so that it disengages with the locking aperture 580, and pulling the cover 550 off the handle 522. The cover 550 can be replaced on the handle 522 by pushing it back onto the handle so that the locking tab snaps back into the locking aperture 580.

According to one aspect of the present embodiments, the cable preparation steps are accomplished with a single tool, so that at least one tool can be removed from the standard toolkit. According to another aspect, the yarn strength elements can be cut to a consistent length without a separate measuring step.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method for preparing a cable having a cable jacket for connectorization, comprising:
    providing a tool having a first handle having a stripper end, a second handle having a stripper end, the second handle being pivotably joined to the first handle, a cutting feature disposed on at least one of the handles and a cable locating slot arranged on the at least one handle having the cutting feature and aligned with the cutting feature;
    placing the cable between the stripper ends;
    removing an end portion of the cable jacket using the tool, leaving a remaining portion of the cable jacket and exposing at least one strength element extending from an end of the remaining portion;
    aligning the at least one strength element with the cutting feature using the cable locating slot; and
    using the cutting feature to sever the at least one strength element.

2. The method of claim 1, wherein the stripper end of the first handle has at least one sharp inwardly-facing edge.

3. The method of claim 1, wherein the cutting feature includes a cover with a cutting aperture formed therein, the step of using the cutting feature comprising pulling the strength element into the cutting aperture.

4. The method of claim 3, wherein the cutting feature comprises a blade with a sharpened edge that is accessible through the cutting aperture, the step of using the cutting feature further comprising severing the strength element on the sharpened edge of the blade.

5. The method of claim 4, wherein the cable locating slot is formed in the cover and is adapted to receive an end portion of the cable, the step of aligning the at least one strength element further comprising placing the end portion of the cable in the cable locating slot.

6. The method of claim 5, wherein the cable locating slot comprises a stop edge arranged to space the cable with respect to the cutting aperture, the step of using the cutting feature further comprising abutting the end of the remaining portion of the cable jacket against the stop edge.

7. The method of claim 5, wherein the blade is at an inwardly facing part of the cover, and the cable locating slot is at an outwardly facing part of the cover, the step of using the cutting feature comprising severing the strength element to a predetermined length from the end of the remaining portion of the cable jacket.

8. The method of claim 7, wherein the predetermined length is in the range of 7-17 millimeters.

9. The method of claim 1, wherein the tool comprises a spring for biasing the stripper ends of the first and second handles apart, the step of removing an end portion of the jacket comprising bringing the stripper ends together against the spring bias.

* * * * *